United States Patent [19]
Chen

[11] Patent Number: 5,951,450
[45] Date of Patent: Sep. 14, 1999

[54] SHAFT ROLLER

[76] Inventor: Ming-Yu Chen, 1152-1 Pishan Rd., Tsaotun, Nantou Hsien, Taiwan

[21] Appl. No.: 08/935,254

[22] Filed: Sep. 22, 1997

[51] Int. Cl.$^6$ .................................................... B23P 15/00
[52] U.S. Cl. .................................. 492/7; 492/39; 492/47
[58] Field of Search ................................ 492/6, 7, 47, 39

[56] References Cited

U.S. PATENT DOCUMENTS

| | | | |
|---|---|---|---|
| 2,428,965 | 10/1947 | Frisco et al. | 492/39 |
| 3,389,450 | 6/1968 | Robertson | 492/7 |
| 3,418,703 | 12/1968 | Thiry | 492/7 |
| 4,467,509 | 8/1984 | Dezen | 492/47 |
| 4,663,809 | 5/1987 | Joutsjoki | 492/7 |
| 4,716,637 | 1/1988 | McIntosh et al. | 492/39 |
| 5,102,237 | 4/1992 | Ide | 492/39 |
| 5,111,565 | 5/1992 | Beaudreault et al. | 492/47 |
| 5,290,223 | 3/1994 | Lehmann | 492/7 |
| 5,471,859 | 12/1995 | Sendzimir et al. | 492/39 |

*Primary Examiner*—Irene Cuda
*Assistant Examiner*—Trinh T Nguyen
*Attorney, Agent, or Firm*—Connolly & Hutz

[57] ABSTRACT

A shaft roller, including a shaft, a casing with two ends, and further, for each of the two ends of the casing, a bearing support, an end bearing, and a protective cap. The roller further includes a plurality of inner tubes, a plurality of ring holders, and a plurality of inner bearings. For each end of the casing, a groove is cut into the inner periphery of the casing for holding a peripheral outward extension of the bearing support. For each end of the casing, the bearing support has a wheel body with spokes, surrounding the end bearing and holding the end bearing with an inward projection. The end bearing is a needle roller bearing around the shaft, having a needle cage with a plurality of needles. For each end of the casing, the protective cap prevents dust and humidity from entering the casing, being attached to the bearing support by a plurality of blocks. Inside the casing, the plurality of inner tubes surrounds the shaft, with one of the plurality of ring holders being inserted between every two inner tubes, supporting the casing. One of the plurality of inner bearings is located between each ring holder and the shaft. Thus mechanical stability and low friction are ensured for various lengths of the casing.

1 Claim, 3 Drawing Sheets

SHAFT ROLLER

BACKGROUND OF THE INVENTION

1. Field of the Invention

The present invention relates to a shaft roller, particularly to a shaft roller made of fiberglass reinforced plastic, which is easy to assemble and has high stability.

2. Description of Related Art

Conventional shaft rollers are made of steel, which easily corrodes and is hard to maintain and assemble. To overcome the deficiencies of metal, fiberglass reinforced plastic has been substituted as material. The strength of fiberglass reinforced plastic, however, has been lower than that of steel, allowing only for small loads.

SUMMARY OF THE INVENTION

The present invention improves on conventional shaft rollers made of fiberglass reinforced plastic, providing strength and low friction needed for high load and fast rotation. The present invention is designable according to actual needs. Any change of length will not influence its strength. Both ends are provided with protections against dust. Long-term use does not require maintenance. So the present invention not only is able to replace conventional steel shaft rollers, but also improves on shaft rollers made of fiberglass reinforced plastic.

An object of the present invention is to provide a shaft rollers made of fiberglass reinforced plastic, which has a novel structure with improved strength and low friction.

Another object of the present invention is to provide a shaft rollers made of fiberglass reinforced plastic with a design that allows to vary the length without influencing the strength of the shaft roller.

A further object of the present invention is to provide a shaft rollers made of fiberglass reinforced plastic, which allows long-term use without maintenance.

A further object of the present invention is to provide a shaft rollers made of fiberglass reinforced plastic, which is tightly closed and will not corrode during long-term use.

The present invention can be more fully understood by reference to the following description and accompanying drawings.

DETAILED DESCRIPTION OF THE PREFERRED EMBODIMENT

Figure 3:
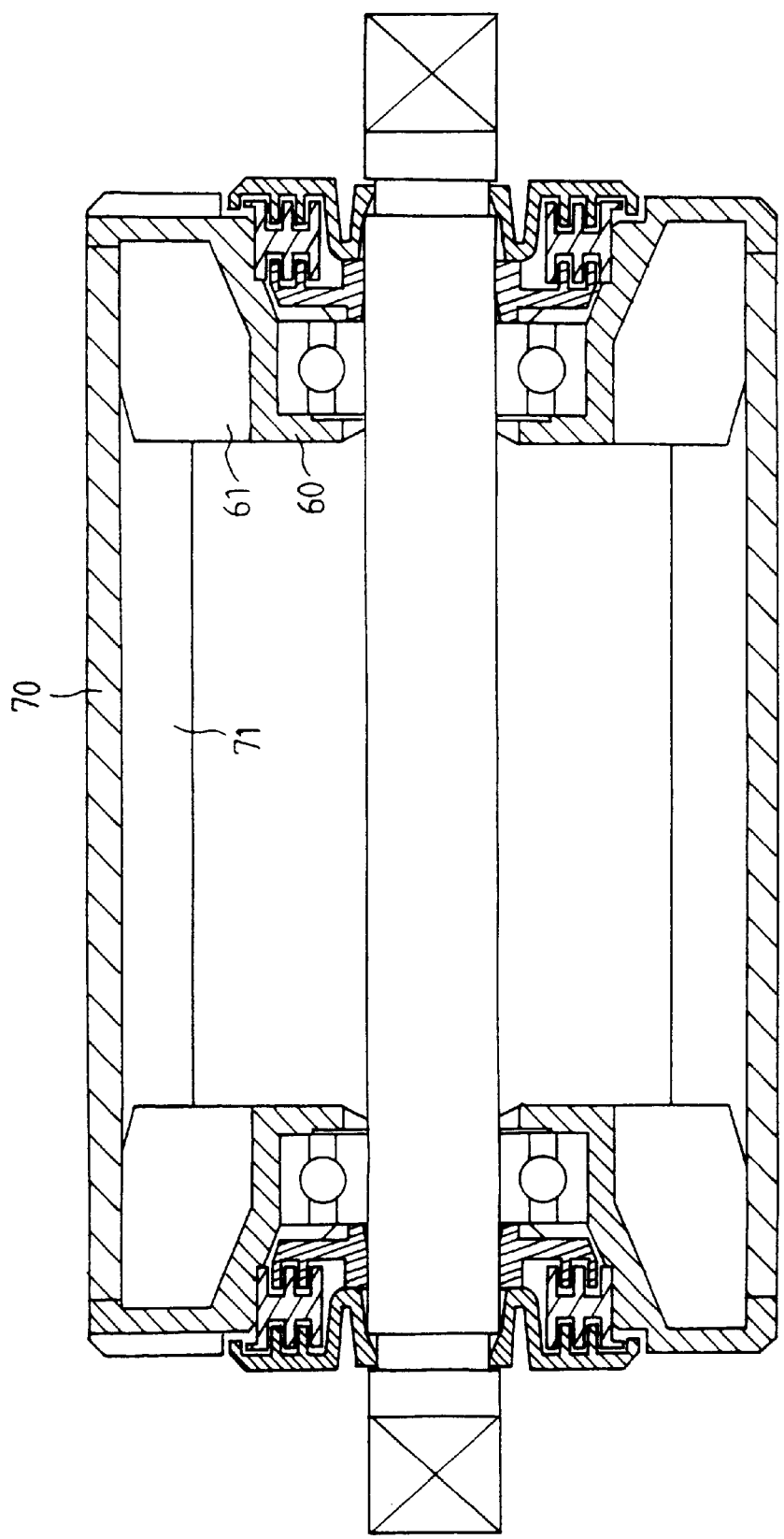
FIG. 3 is a longitudinal sectional view of a conventional shaft rollers made of fiberglass reinforced plastic.

As shown in FIG. 3, a conventional shaft rollers made of fiberglass reinforced plastic comprises a tubular casing 70, bearing supports 60, and die-casted support inlets 61, 71, placed where the casing 70 and the bearing supports 60 join. After die-casting the support inlets 61, 71 they cool and shrink, such that they no longer fit in. This problem becomes severer with increasing size of the shaft roller. Avoiding this problem by leaving out the support inlets 61, 71 leaves the casing 70 without support and without sufficient mechanical strength.

Figure 1:
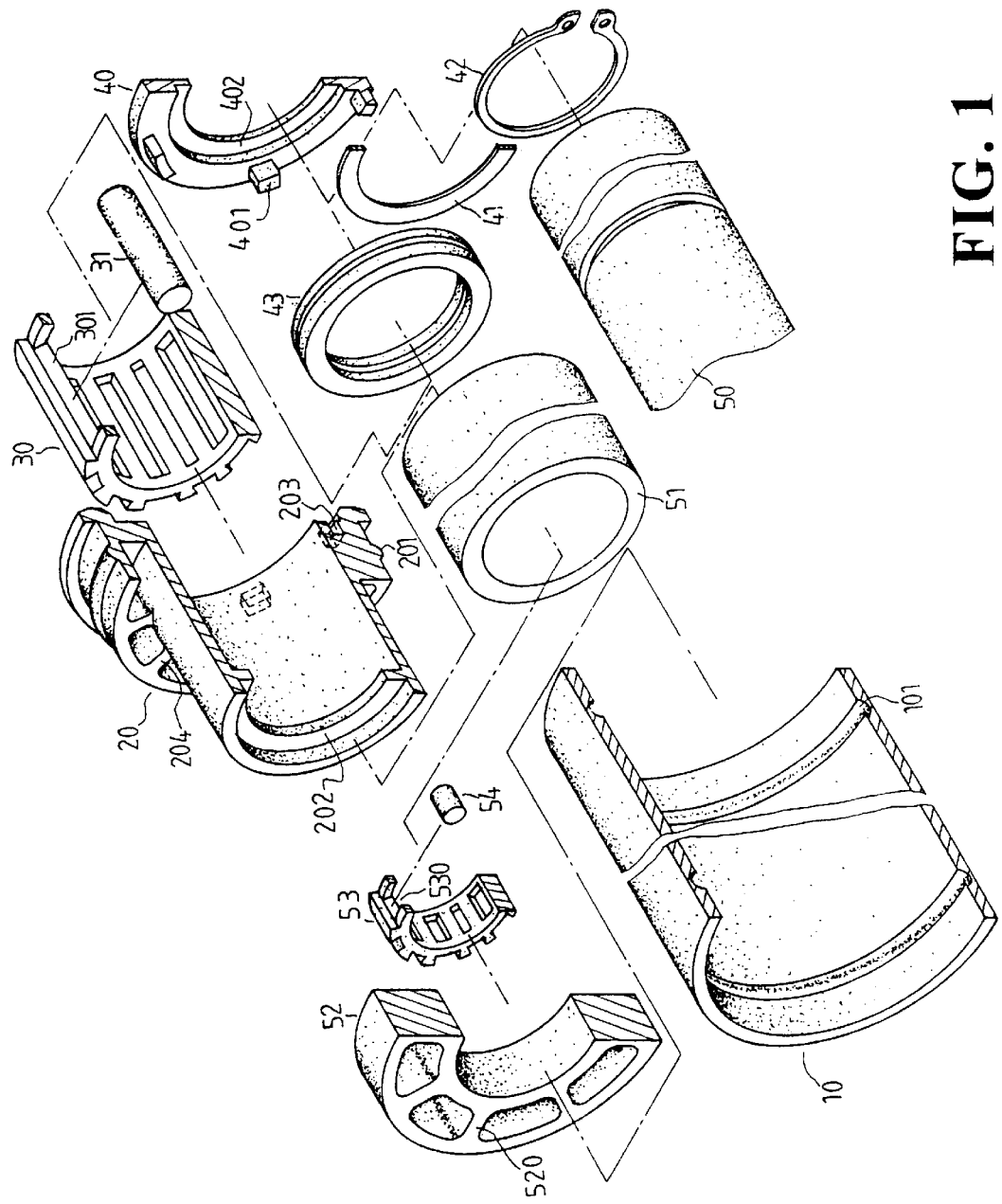
FIG. 1 is an exploded perspective view of the shaft roller of the present invention, with some structural parts cut by half.
Figure 2:
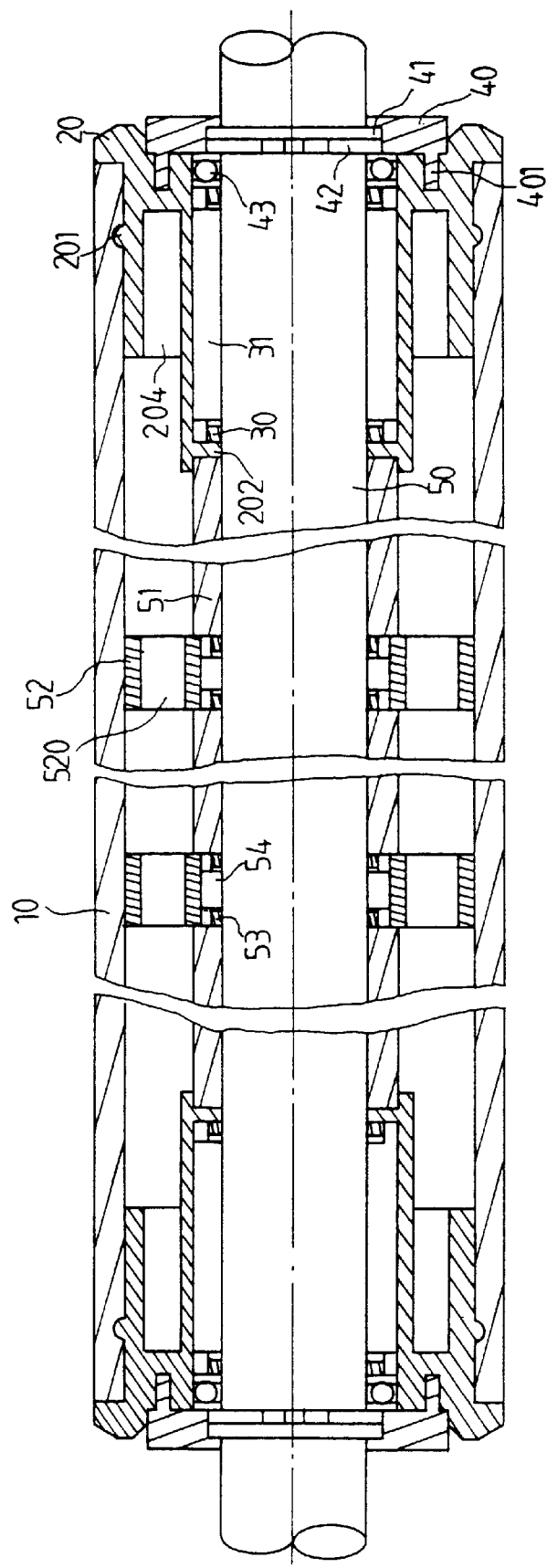
FIG. 2 is a longitudinal sectional view of the present invention, when assembled.

Referring to FIGS. 1 and 2, the shaft roller of the present invention comprises a shaft; a tubular casing 10 with two ends; and, on each of the two ends of the casing, a bearing support 20, an end bearing 30, and a protective cover 40.

Close to each of the two ends of the casing 10, a peripheral groove 101 is cut into the inner periphery of the casing 10. For each of the two ends of the casing 10, the bearing support 20 has a face end and a back end. The face end of the bearing support 20 has a wheel body 204 with a plurality of spokes and a peripheral outward projection 201 to be laid into the groove 101 and held therein. At the back end of the bearing support 20 a peripheral projection 202 extends inward for holding the end bearing 30. The end bearing 30 is accommodated inside the bearing support 20. The end bearing 30 is a needle roller bearing with a face end and a back end, having a needle cage 301 with a plurality of loosely inserted needles 31. The end bearing 30 is located between the bearing holder 20 and the shaft 50, reducing rotational friction, when the shaft rotates against the casing 10. The back side of the end bearing 30 leans against the projection 202. On the face end of the end bearing 30, a holding ring 43 is put on the shaft 50. The protective cover 40 is put on the end of the casing 10, with a back side facing the end bearing 30, holding the end bearing 30 and the holding ring 43. The protective cover 40 has blocks 401 on the back side thereof, which fit into holes 203 on the face side of the bearing support 20, for holding the protective cover 40. The protective cover 40 further has a central depression 402 on the back side thereof for accommodating a closed seal ring 41 and a spring washer 42 inside the seal ring 41. The protective cover 40 keeps dust and humidity away from the shaft 50 inside the casing 10.

Between the projections 202 of the bearing supports 20 on each the two ends of the casing 10, inner tubes 51 surround the shaft 50. Between every two of the inner tubes 51, ring holders 52 are inserted, each of the ring holders 52 having a plurality of spokes 520 extending outward to the casing 10. The ring holders 52 provide better stability for the casing 10. Inner bearings 53, respectively located between the ring holders 52 and the shaft 50, reduce rotational friction. The inner bearings 53 are needle roller bearings, each having a needle cage 530 and a plurality of needles 54.

Since the casing 10 is not only supported by the spokes 204 of the bearing support 20, but also by the spokes 520 of the ring holders 52, good mechanical stability is ensured. The seal ring 41 of the protective cover 40 prevents dust and humidity from entering the inside of the casing 10.

What is claimed is:

1. A shaft roller, comprising:

a shaft;

a casing with two ends and an inner periphery, surrounding said shaft;

a plurality of inner tubes surrounding said shaft within said casing;

a plurality of ring holders; and a plurality of inner bearings;

characterized in that said casing having two grooves cut into said inner periphery close to said two ends respectively;

at each of said two ends being provided with a bearing support, having a face end with a face side and a back end, a wheel body with a plurality of spokes and an outer periphery on said face end, a peripheral outward projection on said outer periphery laying into one of said two grooves, a plurality of holes on said face side, and a peripheral inward projection on said back end;

an end bearing, having a face side, a back side and a needle cage with a plurality of loosely inserted needles, said back side leaning against said inward projection of said bearing support; and a protective cover with a back side facing said face side of said end bearing, having a plurality of blocks fitting into said holes on said bearing support for being held on said bearing support, and a holding ring being inserted between said shaft and said bearing support inside said wheel body;

one of said plurality of inner tubes leaning against said inward projection of said bearing support at each of said two ends of said case;

each of said ring holders having a plurality of spokes and being inserted between two neighboring inner tubes of said plurality of inner tubes; and each of said plurality of inner bearings being located between one of said plurality of ring holders and said shaft and having a needle cage with a plurality of needles.

* * * * *